350-314

CROSS REFERENCE

SEARCH ROOM

95/75

July 1, 1958

F. W. GAGE ET AL 2,841,065

COLOR FILM PRINTER

Filed Nov. 7, 1952

5 Sheets-Sheet 1

X2649
X2651
X2656

INVENTORS
Fred W. Gage
Albert W. Tondreau

July 1, 1958 F. W. GAGE ET AL 2,841,065

COLOR FILM PRINTER

Filed Nov. 7, 1952 5 Sheets-Sheet 2

INVENTORS
Fred W. Gage
Albert W. Tondreau

July 1, 1958 F. W. GAGE ET AL 2,841,065

COLOR FILM PRINTER

Filed Nov. 7, 1952 5 Sheets-Sheet 3

INVENTORS
Fred W. Gage
Albert W. Tondreau

July 1, 1958 F. W. GAGE ET AL 2,841,065

COLOR FILM PRINTER

Filed Nov. 7, 1952 5 Sheets-Sheet 4

INVENTORS

Fred W. Gage

Albert W. Tondreau

COLOR FILM PRINTER

Filed Nov. 7, 1952

INVENTORS
Fred W. Gage
Albert W. Tondreau

United States Patent Office 2,841,065

Patented July 1, 1958

2,841,065

COLOR FILM PRINTER

Fred W. Gage, Beverly Hills, and Albert W. Tondreau, North Hollywood, Calif., assignors to Warner Bros. Pictures, Inc., Burbank, Calif., a corporation of Delaware Application November 7, 1952, Serial No. 319,296

5 Claims. (Cl. 95—75)

This invention relates to printing apparatus, and particularly to a continuous sound color picture film printer of the contact type.

In the printing of color pictures, it is well-known that it is necessary to predetermine the sensitiveness of the emulsion of the positive stock to colored light; to predetermine the density of the color negative being printed; to predetermine the variations in color values in the negative from the correct values; and to predetermine the intensity and color characteristic of the printing light. Knowing these factors, it is also well-known that the printer may be adjusted to finally produce a positive print of constant over-all maximum quality for all sequences from both the density and color standpoints. The present invention is directed to a printer which more efficiently and more accurately maintains the proper printing light intensity and color of the light as impressed on the color negative to compensate for variations in the raw stock emulsion and variations in negative density and color values.

As disclosed and claimed in co-pending U. S. application, Ser. No. 363,604, filed June 23, 1953, now Patent No. 2,797,626, a color negative film tester determines the intensity and color of the light required for obtaining the optimum quality print from a certain negative sequence whether correctly or incorrectly exposed. By translating this data to the printing equipment to be described hereinafter all sequences, regardless of their variations within limits, will be printed so as to have the same average high quality. This is accomplished in a continuous printing operation. To obtain the proper colors in the light as impressed on a negative, color correction filters are used, which have definite variations in color density for each of three colors.

Although other color filters could be used in the present invention, the correction filters are a plurality of density variations of yellow, cyan, and magenta. Furthermore, the present printer varies each color in five density steps, although more or less steps could be used. The first filter, of either yellow, cyan, or magenta, is given a rating of 2½ to indicate the lightest density of that particular color. The next filter is given a rating of 5, which is substantially twice the density of the first filter. The next filter is rated at 10; the next, 20; and the next, 40. Thus, each next higher rated filter will introduce twice the color density of the next lower filter, and so on, for each of the three colors. The amount of the printing light used is varied by varying the size of the aperture in the light path, while a particular fixed filter pack is used to compensate for manufacturing variations in the positive emulsion on which the prints are being made.

The various color correcting filters are inserted under control of a drop bar on a board or panel, whereby the connecting pins are previously positioned to make connections to the solenoids operating the necessary filters to provide the printing light with the correct color for any negative sequence. Since five steps are used for each color, a total of fifteen solenoid-operated filters are employed. A dowser is also used to insure that the light beam is not directed on the filters while the printer is not in operation. Each filter has a transparent section, which is inserted in the light path when its color portion is removed, so as to maintain the light reflection and absorption losses comparable at all times.

The principal object of the invention, therefore, is to facilitate the printing of colored motion pictures.

Another object of the invention is to provide an improved continuous color printer which varies the color of the light as impressed on the negative at the printing point in accordance with the color and density characteristics of the negative being printed.

A further object of the invention is to provide a continuous color printer which provides automatic operation to compensate for negative sequences of different exposures and color values.

A still further object of the invention is to provide a contact color film printer which protects a color negative, permits subtitles to be printed on the prints, and which permits checks to be made on the light source during the operation of the printer to determine that operating conditions are correct.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
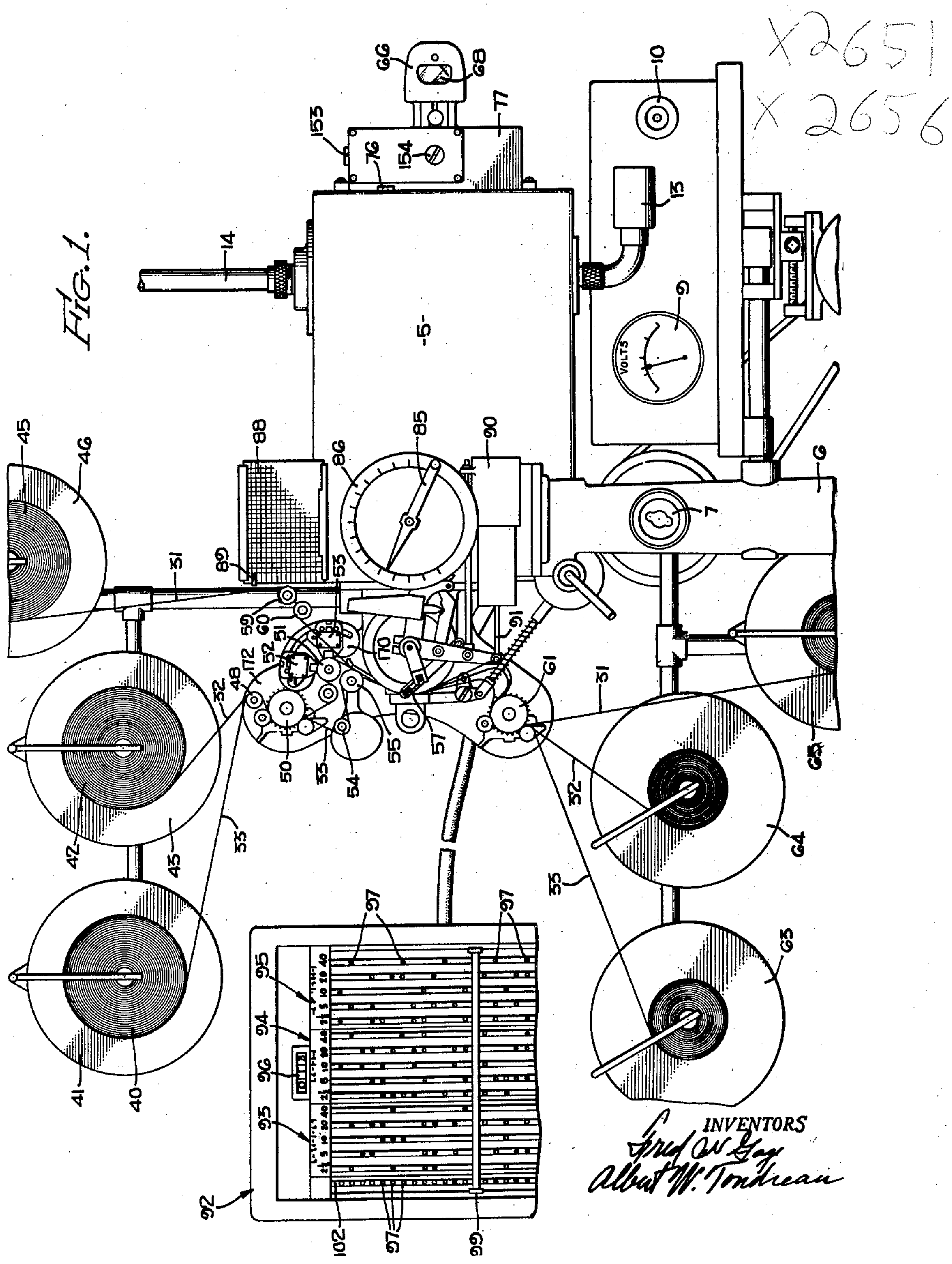
Fig. 1 is a side elevational view of a color printer embodying the invention.
Figure 2:
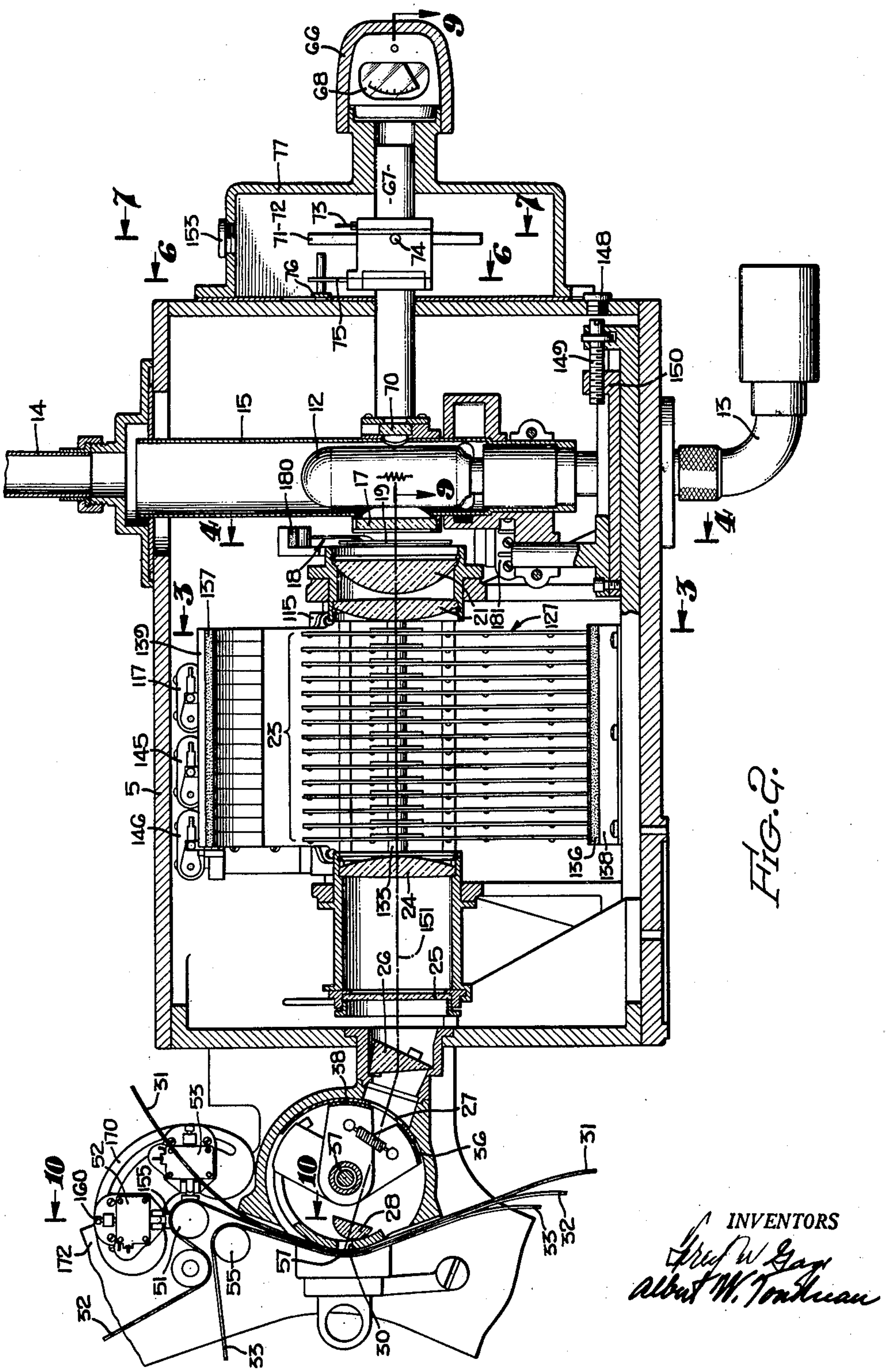
Fig. 2 is a cross-sectional view of the printer shown in Fig. 1.

Referring now to the drawings, in which the same numerals identify like elements, the main printer case 5, which is comparatively air-tight to protect the filters, is mounted on a pedestal 6 having a motor start and stop switch 7 mounted thereon. Also mounted under the printer casing 5, is a voltmeter 9 and a printing lamp rheostat, the control knob therefor being shown at 10. Referring to Figs. 1 and 2 simultaneously, a projection lamp 12 is cooled by air passing past the lamp coming from an intake tube 13 and leaving through an exit tube 14. The air is directed between the tubes 13 and 14 by a tube 15. Printing light from the lamp 12 passes through a heat filter 17 and past a dowser 18 when its shutter 19 is out of the light beam (see Fig. 4), through condensing lenses 21, through a group of fifteen filter units 23, through a projection lens 24, an emulsion balancing filter pack 25, a light deflecting prism 26, a variable aperture 27, to a cylindrical light concentrating lens 28. Light from the lens 28 passes through an aperture 30 to a negative protecting film 31, a negative film 32, and a positive film 33, all of which are in contact at the printing point at the aperture 30. The aperture 27 is varied by a plate 36 pivoted at 37, which is adjusted to vary the aperture 27 with respect to the plate 38, as will be described later.

Referring now to Fig. 1, the positive raw stock 33 is fed from a roll 40 on a reel 41. The negative film 32 is fed from a roll 42 on a reel 43, while a transparent protective film 31 is fed from a roll 45 on a reel 46. The two films 32 and 33 come in contact at a guide roller 48 and are then advanced by a sprocket 50. The negative film, which has been notched according to its density and color values, passes around the roller 51, past a microswitch 52, and a microswitch 53. The positive film 33 by-passes the switches by passing around rollers 54 and 55, and again contacts the negative 32 just prior to the printing point 57. The protective film 31 is brought to the printing point over rollers 59 and 60. On the other side of the printing point, all three films are brought in different size loops to the sprocket 61, from which the positive 33 goes to a reel 63, the negative 32 goes to a reel 64, and the protective film 31 goes to a reel 65. Although the film 31 is primarily used to protect the negative from scratches and abrasions at the printing aperture, it may also be used to print superimposed titles in different languages on the picture films when such titles are carried by the film 31.

Referring now to the elements for indicating the characteristic of the light source 12, reference is made to Fig. 2 and to Figs. 6 to 9, inclusive. At the rear of the printer and within a housing 66, is a photoelectric light cell and meter combination 68, which shows the intensity of the light 12 as modified by heat filter 70 corresponding to heat filter 17, light intensity varying filters 71—72, and color filter pack 73, the light being confined to a tube 67. The tube may be slid toward the meter 68 when necessary to replace lamp 12 by a rod 78 extending through the casing 77.

Figures 6, 7, 8, 9:
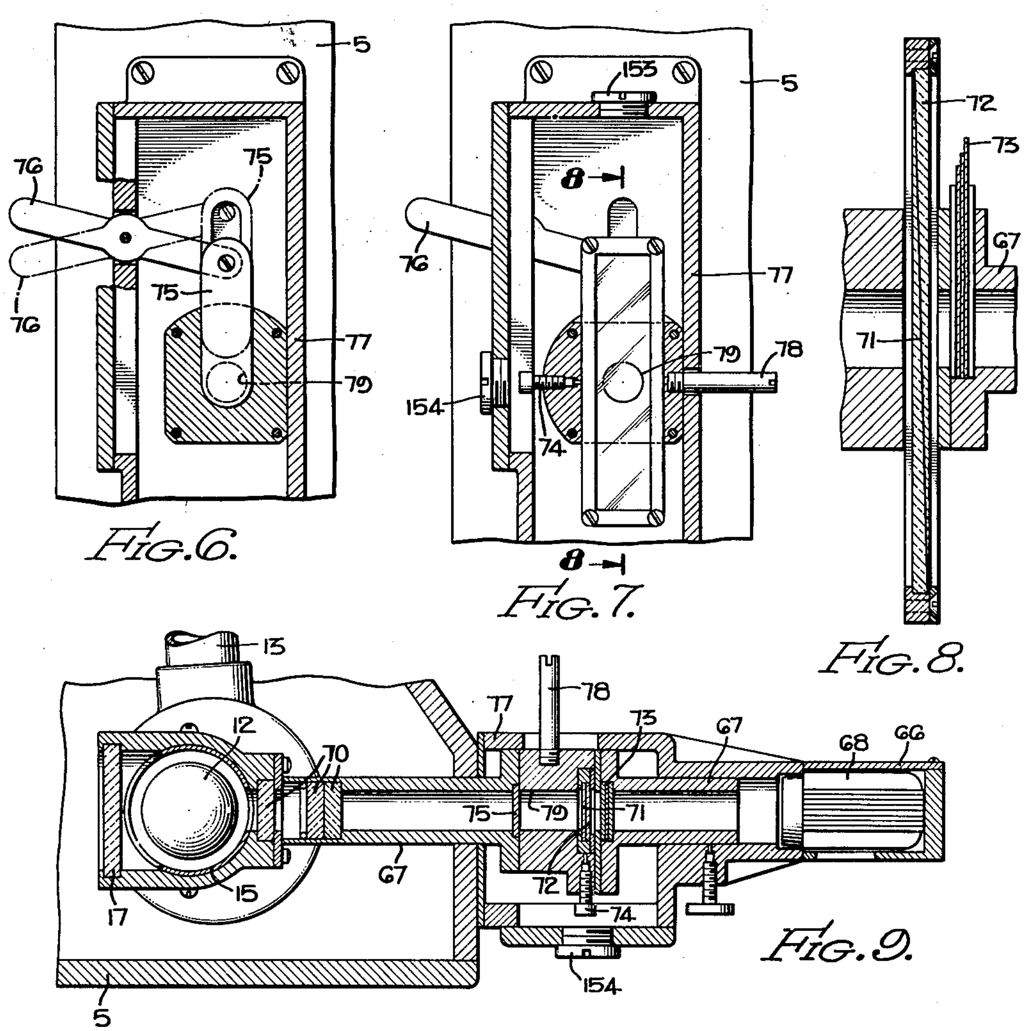
Fig. 6 is a detail view of the meter shutter taken along the line 6—6 of Fig. 2.
Fig. 7 is a cross-sectional view, similar to Fig. 6, taken along the line 7—7 of Fig. 2.
Fig. 8 is an enlarged view of the density filter used in the meter system taken along the line 8—8 of Fig. 7.
Fig. 9 is a plan view of the light source and meter arrangement taken along the line 9—9 of Fig. 2.

The photoelectric cell and meter 68 indicates the output of light from the lamp 12 as it impinges on the negative 32. Filter 71—72 is made of two tapered sections, one of which is neutrally opaque, while the other is transparent. This type of filter keeps the light rays parallel. Thus, as the filter is moved, the intensity of the light is varied, the filter being held by screw 74, as shown in Fig. 9. The color filter pack 73 eliminates ultraviolet from the photocell to prolong its life.

To prevent fatigue of the photocell, a shutter 75 mounted on an arm 76, operative externally of the casing 77, is used to permit light to reach the photocall only when a measurement is to be taken. That is, when the shutter 75 is raised, light passes through the opening 79 to the photoelectric cell. Thus, during the operation of the printer, if at any time the operator desires to check on the condition of his light source 12, it is only necessary to press the lever 76 downwardly and take a reading at the meter 68. If the intensity is too low or too high, the voltage on lamp 12 may be varied by knob 10.

It is well-known, in the operation of motion picture film printers, that the intensity of the light striking the film or quantity of light striking the film may be varied. It may be varied by changing the amount of current to the lamp filament, which varies the intensity of the light striking the film, or by changing the aperture in the light beam, which varies the amount of light striking the film. In the present printer, the latter system is used, since changes in light intensity may involve color changes, which are undesirable. Thus, in Fig. 1, a standard type of light control is shown which includes a handle 85 to pre-set the size of the light aperture 27, as indicated by the dial indicia 86. That is, as the size of the aperture 27 varies, different exposures are made at the printing point 57. While one exposure is being made, the handle is pre-set for the exposure of the following sequence, if it requires a greater or lesser amount of light at the printing point, as will be indicated on a cue sheet 88 and the drop pointer indicator 89. The adjustment of the handle 85, however, does not immediately vary the aperture 27. Since the negative film 32 is notched at the proper point to produce a change in size in the aperture 27, when the notch reaches microswitch 53, it will energize a coil 90 which will adjust the aperture 27 through the link mechanism 91 to the setting of the handle 85. It also releases the pointer 89 so it is placed at the setting for handle 85 at the next sequence. The operator then adjusts the handle 85 for the next size of aperture 27, as indicated on 88. This is standard equipment on many continuous printers.

Figures 3, 4, 5:
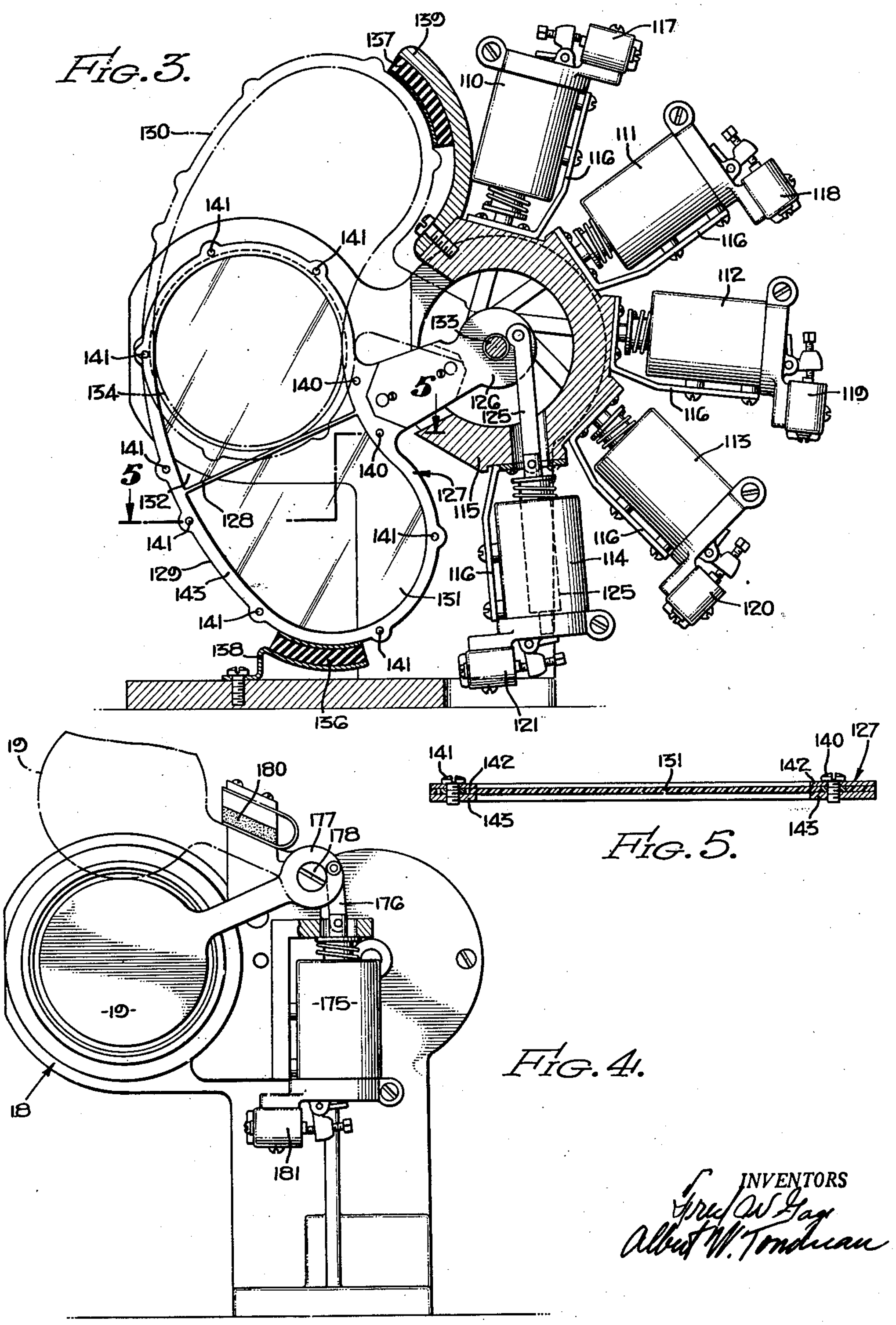
Fig. 3 is an end elevational view of the color filter mechanism taken along the line 3—3 of Fig. 2.
Fig. 4 is a detailed view of the dowser mechanism taken along the line 4—4 of Fig. 2.
Fig. 5 is a detailed view taken along the line 5—5 of Fig. 3.

In the present printer, a second microswitch 52 is provided which operates a board 92, shown in Fig. 1, and which is divided into three sections 93, 94, and 95 for the three colors yellow, cyan, and magenta, respectively. A footage counter is provided at 96. It will be noted that each section 93, 94, and 95 has five vertical bars with a plurality of openings therein and into which contact pins 97 are fitted in a manner well-known in the art. Thus, when a bar 99 is dropped from one position to the next by a drop coil 100 (see Fig. 12), a contact will be made from a pin in the hot bar 102 to any of the bars in which pins 97 have been positioned, as shown in the drawing. When a connection is made between one or more of the pins on the color bars and the hot bar 102, a corresponding number of the fifteen solenoids are energized, Fig. 3 showing five solenoids 110 to 114, inclusive, mounted on brackets 116 attached to frame 115. Switches 117, 118, 119, 120, and 121 are provided for each of the solenoids, respectively, the purpose of which will be explained in connection with Fig. 12. Each solenoid has an armature connected to the pivoted frame of its respective color filter unit.

To describe one of these connections, reference will be made to solenoid 114, which has its armature 125 connected to pivoted portion 126 of the kidney-shaped filter frame 127 having a central septum bar 128. Thus, when the solenoid 114 is energized, it rotates the kidney-shaped filter frame on its pivot 133 from the position shown in solid lines 129 to the position shown in dotted lines 130. In each of the filter frames, there is a color filter section of one particular desity, such as shown at 131, and a clear transparent section 132, so that when the frame is in its upper position, as shown in Fig. 3, the color filter 131 is in the light beam path indicated by the circle 134. When the solenoid 114 is de-energized, the transparent section 132 will be positioned within the circle 134. The bar 128 reinforces the splice where the two filter sections overlap.

At 136 and 137, are resilent bumpers mounted on brackets 138 and 139, respectively, to reduce the shock of the frame 127 when it is moved to its terminal positions. Also, to protect the filters themselves, which are thin gelatin sheets, from damage when frames 127 are suddenly stopped, each section is mounted on one tight screw, such as screw 140 shown in Fig. 5, while the remaining screws, such as shown by screw 141, are positioned in oversize holes in the filter. Thus, upon the sudden stopping of the frame 127, the film may have a slight movement between the frame sections 142 and 143. Metal spacing washers prevent the sections 142 and 143 from bearing against the gelatin. This construction thus permits the gelatin to remain flat during contraction and expansion.

Referring to Fig. 2, there are three rows of solenoids, such as shown in Fig. 3, to actuate the fifteen filter units 23. The top switch 117 is shown for one bank of five units, and similar top switches 145 and 146 are shown for the other banks of five solenoids each. In Fig. 2, a cap screw 148 is shown, which, when removed, provides access to a set screw 149, which may be turned to adjust the base 150 of the lamp 12 axially with respect to the optical axis 151. Cap screws similar to 148 are shown at 153, 154 to provide access for other adjusting screws within casings 5 and 77.

Figure 10:
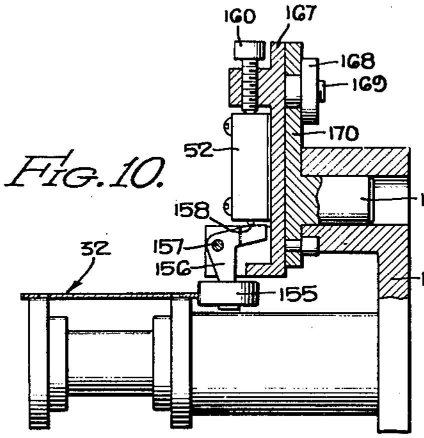
Fig. 10 is a detail view of the film microswitch taken along the line 10—10 of Fig. 2.
Figure 11:
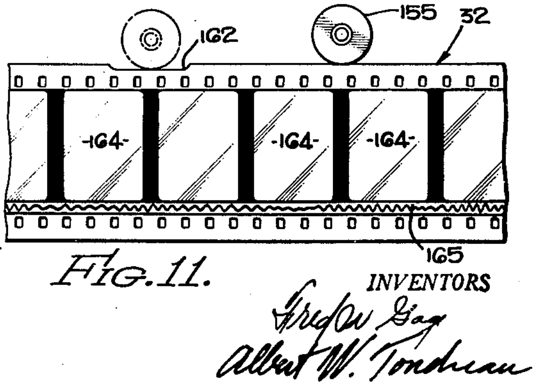
Fig. 11 is a diagrammatic view showing the operation of the microswitch rollers on the film.

In Fig. 10, the operation of a microswitch is illustrated, the edge of the film 32 being in contact with the roller 155, which is rotatably mounted on an arm 156, pivoted at 157, the other end of the arm bearing against a switch actuation pin 158 passing within the switch 52. A set screw 160 is used to obtain the proper adjustment between the position of the arm 156 and the edge of the film 32. As shown in Fig. 11, the film 32 has notches such as shown at 162, into which the roller 155 moves, and which permits the pin 158 to either make or break contact according to the connections to the switch 52. It will be noted that the film 32 has picture portions 164 and a sound track portion 165, as is well-known in the art. The microswitch 52 is mounted on the bracket 167 and held in position by a nut 168 on a stud 169 passing through a plate 170, which is on a stub shaft 171 in the frame 172.

Referring now to Fig. 4, the dowser is illustrated as being operated by a solenoid 175, which, when energized, pulls the armature 176 downwardly, the end of the armature being connected to the eye portion 177 pivoted at 178, and which rotates the shutter 19 upwardly against the resilient bumper stop 180 when it is desired to pass light from the lamp 12 to the films. A switch 181 similar to switches 117 to 121, inclusive, shown in Fig. 3, is used for the purpose of changing the connections to the windings of the solenoid 175, which will now be explained.

Figure 12:
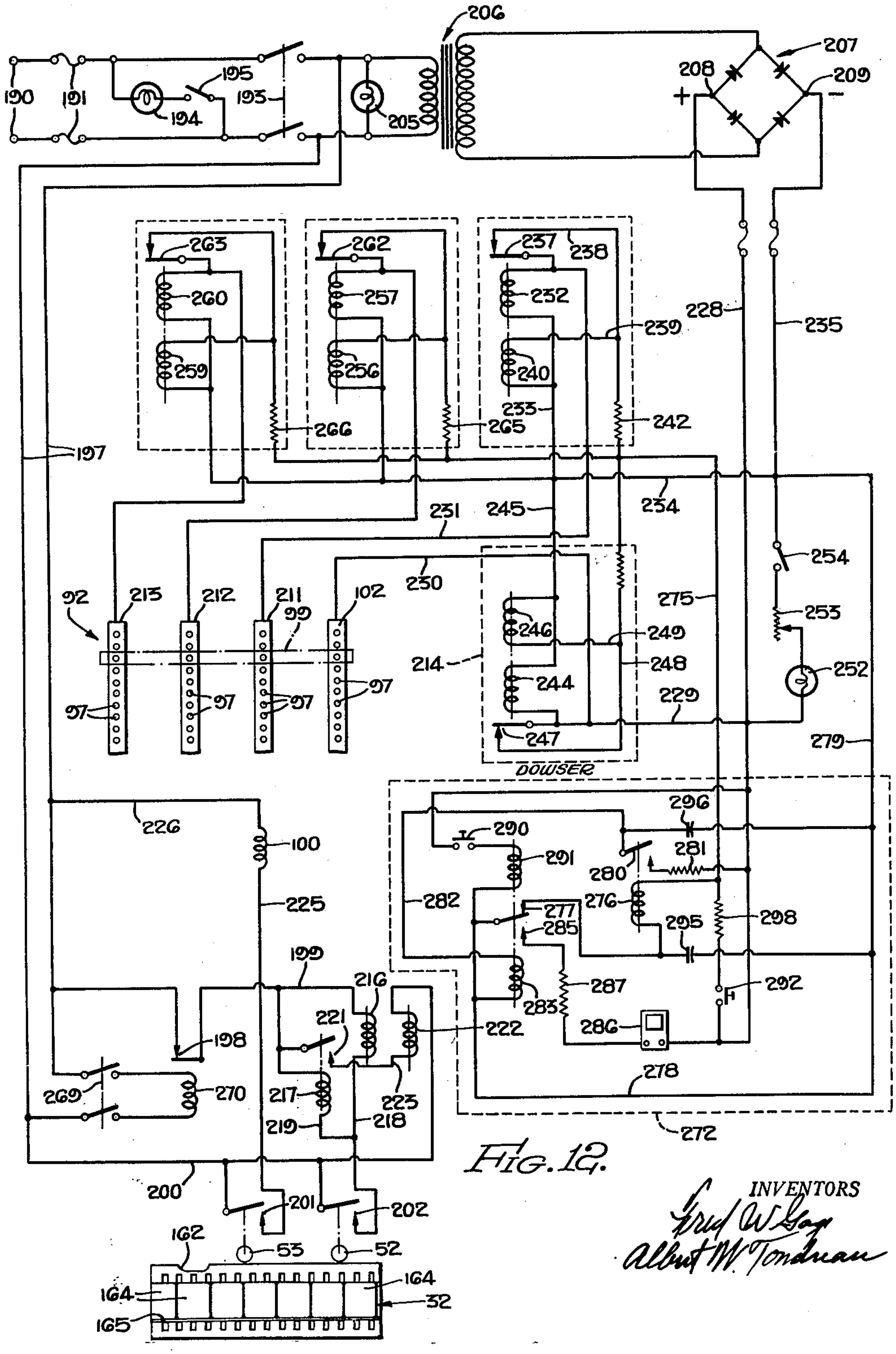
Fig. 12 is a schematic and diagrammatic arrangement of the electrical control circuit embodied in the invention.

Referring now to the circuit diagram in Fig. 12, an alternating current power supply is connected to the terminals 190, and fed over fuses 191 to a double-pole switch 193. A telltale lamp 194 is energized when the switch 195 is closed. Upon the closing of the switch 193, alternating current is fed over conductors 197, closed switch contacts 198, and conductors 199 and 200 to open contacts 201 and 202. The closing of switch 193 also feeds current across the terminals of a lamp 205 and the primary winding of a transformer 206, the secondary of which is connected to a direct current rectifier 207 having a positive terminal 208 and a negative terminal 209. To illustrate the operation of the filter units, only one vertical bar for each primary color is illustrated. Thus, we have hot bar 102, as shown in Fig. 1, and also bar 211 for magenta, bar 212 for cyan, and bar 213 for yellow, it being understood that there are four more vertical bars for each of the colors and duplicate circuits. The dowser unit is shown within the dotted lines 214.

Now, as the film 32 is advanced, assume that the first switch actuated would be 52, which closes contacts 202, and thus causes the energizing of windings 216 and 217 over conductors 218 and 219, respectively. The energization of winding 217 will close contacts 221 and energize winding 222 over conductor 223. Thus, the winding 216 will drop the card index pointer 89 one line, as shown in Fig. 1, while the energization of winding 222 will energize the solenoid 90 to release the mechanism controlling aperture 27 to adjust the aperture to the size set by lever 85. Thus, the proper amount of printing light will be provided at the aperture 30. This operation has been standard practice for some time.

When the notch actuates switch 53 and closes contacts 201, the coil 100 is energized over conductors 225, 226, and 197, which permits the bar 99 to drop to its next lower position. But, upon the dropping of the bar 99, a circuit is made starting from the positive terminal 208 of the rectifier 207 and therefrom over conductors 228 and 229 and 230 to hot bar 102, then through drop bar 99 to magenta bar 211, then over conductor 231, coil 232, conductor 233, conductor 234, and conductor 235 to the negative terminal 209. It will be noted that there is a parallel circuit from the coil 232 over normally closed switch 237, conductor 238, conductor 239, and coil 240 to conductor 233. Thus, upon the instant that the bar 190 connects the bars 102 and 111, current will flow through both coils 232 and 240 in parallel. This provides a very rapid initial action of the filters into the light path. However, upon the energization of coil 232, contacts 237 are broken, which then eliminates the coil 240 and permits coil 232 to take sufficient current to hold the filter in position. A fifty-ohm isolating resistor 242 is used to isolate the coils of the different solenoids in the event that the contacts 237 are not broken.

It will be noted that, upon the closing of switch 193, the dowser solenoid having coils 244 and 246 is immediately energized over a circuit from positive terminal 208, over conductors 228 and 229, dowser coil 244, conductor 245, conductor 234, and conductor 235 to negative terminal 209. The second dowser coil 246 is in parallel with the coil 244 over conductor 229, closed contacts 247, and conductors 248 and 249. However, upon energization of coil 244, contacts 247 are broken and coil 244 is sufficient to hold the dowser shutter out of the light path, although the parallel energization of both coils provides a rapid initial action. A checking light 252 with its rheostat 253 and switch 254 are provided across the positive and negative terminals of the rectifier 207.

The circuit just traced for one of the magenta solenoids may also be traced for the cyan and yellow solenoids, the coils 256 and 257 for the cyan solenoids, and the coils 259 and 260 for the yellow solenoids operating in the same manner as coils 240 and 232, respectively, for the magenta solenoid. Cyan and yellow switches 262 and 263 operate in the same manner as switch 237 of the magenta solenoid. Each solenoid has its isolating resistors 265 and 266. Although only three circuits have been illustrated, the entire fifteen filters may be inserted simultaneously, the actual number inserted for any sequence being determined by the tests made on each negative sequence.

The system also includes an alarm circuit, it being understood that at any time it is desired to disable the microswitches 52 and 53, a manual switch 269 may be closed to energize the solenoid 270, which will open the contacts 198. However, the alarm circuit shown within dotted lines 272 will now be described, this circuit indicating that one of the solenoids has not actuated its filter or the protective switches 237, 262, 263, etc. have not opened.

Assume that the switch 237 did not open, then one terminal of the isolation resistor 242 will be connected over conductor 275 to relay coil 276, closed switch 277, and conductors 278, 279, and 235 to the negative terminal of the rectifier 207. The relay 276 is a slow-to-operate relay to provide time for switch 237 to open. However, if switch 237 or its counterpart does not open, contacts 280 will close, which will then connect the positive terminal 208 of the rectifier over resistor 281, contacts 280, conductor 282, coil 283, and conductors 278, 279, and 235 with the negative terminal 209 of the rectifier 207. Now, coil 283 will pull its swinger to contact 285 which will close the circuit from the positive side of the rectifier through a buzzer alarm 286 over resistor 287 and conductors 278, 279, and 235 to the negative terminal of the rectifier. This alarm will continue to sound until a key 290 is pressed, which will energize the coil 291 to return the swinger 277 to its upper contact. A similar type of switch 292 with its resistor 298 is provided for testing purposes. The condensers 295 and 296 are used to provide the proper time relay to let the switches 237, 262, 263, etc. have time to open.

The above described printer, therefore, is one which, at the proper times, varies the amount of color characteristic of the printing light as the various sequences are being printed to a continuous roll of raw stock to provide the final print with the correct density and color values, regardless of the density and color values of the negative sequences.

We claim:

1. A mechanism for controlling the color of the light impressed upon a negative color film comprising a plurality of kidney-shaped filter frames arranged in parallel planes and perpendicular to the optical axis of a light path, a color filter in approximately one-half of each of said frames and transparent material in the remaining portions of said frames providing a light loss comparable to that introduced by said color filter and introduced in said light path, said transparent material being in said light path when said color filter is removed, all of said frames being mounted on a common axis, a corresponding number of electrical means, energization of one of said electrical means introducing a corresponding one of said filters into said light path and de-energization of said one electrical means introducing said transparent material of said filter frame into said light path, said filters being flexibly mounted at one point in each of said respective frames and loosely attached at other points in said frames to permit movement of said filters when stopped after movement of said frames by said electrical means.

2. A motion picture color film printer comprising a light source, means adapted to bring a negative color film and a positive film of raw stock into contact, means for advancing said films in contact at a printing aperture of fixed size, optical means for directing light in a single light path from said source to said aperture, fixed means in said light path for adjusting the color of said light in accordance with the type of said raw stock, a variable aperture in said light path for adjusting the amount of said light in said light path reaching said aperture in accordance with the density of said negative, and a plurality of adjustable means in said light path adapted to be introduced into and removed from said light path for varying the color of said light in said path in accordance with the departures in color in said negative from the correct colors, said adjustable means maintaining the intensity of the light in said path substantially conconstant regardless of the variation in color by said light, said last mentioned means including a plurality of flat color filters in parallel planes adjacent one another, and perpendicular to said light path, each filter having a transparent section automatically movable into said light path upon removal of said filter from said light path, a frame for each filter, each color filter being a gelatin sheet occupying substantially one-half of each frame, the other half of said frame being occupied by a transparent gelatin sheet, a transparent sheet being inserted in said light path when a respective color filter is removed therefrom, solenoids being provided for moving said frames, each solenoid having two windings simultaneously energized to move said frames, switches being provided and operated upon energization of said solenoids to eliminate the current from one winding of an energized solenoid after its frame has been moved, and an alarm circuit connected to said solenoid windings for indicating the failure of operation of any of said switches.

3. A motion picture film printer comprising a light source, means for obtaining a predetermined light intensity from said source, an optical system for forming a substantially horizontal light path from said source to an aperture, means for varying the size of said aperture, means adapted to bring a negative color film and a positive film into contact, a plurality of filters in said light path, said filters being provided with transparent portions and colored portions, said transparent portions being adapted to be positioned in said light path when said colored portions are removed from said path, means for moving said filters, said moving means including a frame and a pivoted portion attached to said frame for each filter, all of said portions being pivoted on a common substantially horizontal axis to obtain movement of said filters in vertical parallel planes, solenoids for actuating said portions, electrical circuits for controlling the separate energization of each of said solenoids, and switch means adapted to be actuated by said negative film, said switch means controlling the energization of said aperture varying means to vary the size of said aperture and the energization of a predetermined number of solenoids to vary the number of filters in said light path, said solenoids each having a pair of windings initially energized to rapidly actuate their respective armatures, means being provided to de-energize one of said pair of windings after actuation of their respective armatures to hold said armatures in respective actuated positions.

4. A mechanism for controlling the color and intensity of the light impressed upon a negative color film comprising a plurality of kidney-shaped filter frames arranged in vertical parallel planes and perpendicular to a substantially horizontal optical axis of a light path, a color filter in approximately one-half of each of said frames and transparent material in the remaining portions of each of said frames for providing a light loss comparable to that introduced by said color filter when said transparent material is introduced in said light path, said transparent material being in said light path when said color filter is removed, all of said frames being pivotally mounted on a common axis, a corresponding number of electrical means for moving said filters, energization of one of said electrical means introducing a corresponding one of said filters into said light path and de-energization of said one electrical means introducing said transparent material of said filter frame into said light path, a variable aperture in said light path, and additional electrical means to vary the size of said aperture to vary the amount of light impressed on said negative film as the color of said light is varied by said filters, said first mentioned electrical means being solenoids arranged substantially radially about the pivotal axis of said frames in parallel groups, each solenoid having a plurality of pairs of windings initially energized to rapidly actuate each of said frames, a corresponding plurality of switches being provided, said switches being actuated by the energization of said windings for de-energizing one of each of said pairs of said plurality of windings, the other of each of said pairs of windings holding said frame in actuated position.

5. A motion picture color film printer comprising a light source, means adapted to bring a negative color film and a positive film of raw stock into contact, means for advancing said films in contact at a printing aperture of fixed size, optical means for directing light in a single substantially horizontal light path from said source to said aperture, fixed means in said light path for adjusting the color of said light in accordance with the type of said raw stock, a variable aperture in said light path for adjusting the amount of said light in said light path reaching said aperture of fixed size in accordance with the density of said negative, a plurality of filters pivotal in vertical parallel planes on a common axis, each filter having a colored and a non-colored portion and being adapted to be introduced into and removed from said light path for varying the color of said light in said path in accordance with the departures in color in said negative from the correct colors, said non-colored portions of said filters being substituted for said colored portions when said colored portions are removed from said light path for maintaining the light loss in said path substantially constant regardless of the number of filters in said light path, and a preadjustable means for varying the size of said variable aperture in accordance with the density of said negative, kidney-shaped frames being provided for said color filters, each color filter being a gelatin sheet occupying substantially one-half of each frame, the other half of each frame being occupied by a transparent gelatin sheet, a transparent sheet being inserted in said light path when a respective color filter is removed therefrom, solenoids being provided for moving said frames, said solenoids being arranged in parallel groups, the solenoids in each group being arranged substantially radially to the common axis of said filters, each solenoid having two windings simultaneously energized to rapidly move said frames upwardly, switches being provided and operated upon energization of said solenoids to eliminate the current from one winding of an energized solenoid after its frame has been moved to hold said frame in the position to which it was moved by the simultaneous energization of said two windings.

References Cited in the file of this patent

UNITED STATES PATENTS

| | | |
|---|---|---|
| 1,803,404 | Owens | May 5, 1931 |
| 1,888,910 | De Forest | Nov. 22, 1932 |
| 1,925,355 | Whitson | Sept. 5, 1933 |
| 2,008,904 | Fishback | July 23, 1935 |
| 2,009,145 | Nathan | July 23, 1935 |
| 2,061,069 | Garbutt et al. | Nov. 17, 1936 |
| 2,117,727 | Jones | May 17, 1938 |
| 2,243,047 | Foster | May 30, 1941 |
| 2,244,965 | Roberts | June 10, 1941 |
| 2,300,970 | Riess | Nov. 3, 1942 |
| 2,354,108 | Flemming | July 18, 1944 |
| 2,438,303 | Simmon | Mar. 23, 1948 |
| 2,500,049 | Williams | Mar. 7, 1950 |
| 2,557,182 | Forgett | June 19, 1951 |
| 2,565,399 | Simmon | Aug. 21, 1951 |
| 2,606,477 | Leslie | Aug. 12, 1952 |

OTHER REFERENCES

Herrnfeld: "Printing Equipment for Ansco Color Film," article in "The Journal of the Society of Motion Picture and Television Engineers," vol. 54, No. 4, April 1950, pp. 454–463 cited.